(12) United States Patent
Hartwig et al.

(10) Patent No.: US 8,579,474 B2
(45) Date of Patent: Nov. 12, 2013

(54) BÉZIER CURVE REFLECTOR, LIGHT SOURCE ARRANGEMENT AND PROJECTOR APPARATUS

(75) Inventors: Ulrich Hartwig, Berlin (DE); Henning Rehn, Berlin (DE)

(73) Assignee: OSRAM Gesellschaft mit beschraenkter Haftung, Munich (DE)

(*) Notice: Subject to any disclaimer, the term of this patent is extended or adjusted under 35 U.S.C. 154(b) by 113 days.

(21) Appl. No.: 13/147,818

(22) PCT Filed: Feb. 23, 2010

(86) PCT No.: PCT/EP2010/052233
§ 371 (c)(1),
(2), (4) Date: Aug. 4, 2011

(87) PCT Pub. No.: WO2010/105890
PCT Pub. Date: Sep. 23, 2010

(65) Prior Publication Data
US 2011/0317430 A1    Dec. 29, 2011

(30) Foreign Application Priority Data
Mar. 18, 2009    (DE) .................. 10 2009 013 812

(51) Int. Cl.
*F21V 7/04*    (2006.01)
(52) U.S. Cl.
USPC ....... 362/347; 362/297; 362/296.01; 362/341
(58) Field of Classification Search
USPC ................ 362/511, 297, 296.01, 341, 347
See application file for complete search history.

(56) References Cited

U.S. PATENT DOCUMENTS

| 4,355,350 | A | 10/1982 | Mader |
| 5,065,287 | A * | 11/1991 | Staiger et al. ................ 362/518 |
| 5,408,363 | A | 4/1995 | Kano |
| 5,661,828 | A | 8/1997 | Riser et al. |
| 6,547,416 | B2 | 4/2003 | Pashley et al. |
| 8,000,063 | B2 | 8/2011 | Yamaguchi et al. |
| 2001/0009354 | A1 | 7/2001 | Natsume |
| 2002/0085384 | A1* | 7/2002 | Tiesler-Wittig ............... 362/511 |
| 2007/0268694 | A1 | 11/2007 | Bailey et al. |
| 2008/0165437 | A1 | 7/2008 | DiDomenico |
| 2009/0128921 | A1* | 5/2009 | Roth ............................. 359/641 |
| 2010/0231882 | A1 | 9/2010 | Dinger et al. |

FOREIGN PATENT DOCUMENTS

| CA | 2071635 C | 6/1991 |
| DE | 102007045396 A1 | 4/2009 |
| EP | 0519112 A1 | 12/1992 |
| EP | 0915286 A2 | 5/1999 |
| JP | 2003031007 A | 1/2003 |
| JP | 2004311162 A | 11/2004 |
| JP | 2007287226 A | 11/2007 |
| WO | 2007081812 A2 | 7/2007 |
| WO | 2008089324 A2 | 7/2008 |
| WO | 2009064275 A1 | 5/2009 |

OTHER PUBLICATIONS

English language abstract of JP2004-311162 A.
English language abstract of JP 2003-31007 A.

* cited by examiner

*Primary Examiner* — Robert May

(57) ABSTRACT

A reflector may have a reflective surface, wherein the contour of the reflective surface is traversed by a Bézier curve.

13 Claims, 2 Drawing Sheets

BÉZIER CURVE REFLECTOR, LIGHT SOURCE ARRANGEMENT AND PROJECTOR APPARATUS

RELATED APPLICATIONS

The present application is a national stage entry according to 35 U.S.C. §371 of PCT application No.: PCT/EP2010/052233 filed on Feb. 23, 2010, which claims priority from German application No.: 10 2009 013 812.9 filed on Mar. 18, 2009.

TECHNICAL FIELD

Various embodiments relate to a reflector having a reflective surface. Various embodiments also relate to a light source arrangement in which the reflector according to various embodiments is used. Finally, various embodiments also relate to a projector apparatus having such a light source arrangement.

BACKGROUND

Reflectors are used whenever a light source emits light omnidirectionally or else over a solid angle which is not suitable for the intended purposes.

Reflectors are, as preferably also provided in the present instance, often manufactured from a stable base material onto which a reflective layer is applied. The reflective layer points toward an interior space which is provided to hold a lamp.

The shape of conventional reflectors, in particular of the contour of the reflective surface, is based on conic sections. A section through the reflector reveals a conic section in this case. As a rule the reflector is a rotational body of a conic section. Conventional reflectors thus have for example the shape of a paraboloid (rotational body of a parabola) or of an ellipsoid (rotational body of an ellipse). Parabolic reflectors and ellipsoidal reflectors can advantageously be used if the light needs to be strongly parallelized (parabolic reflector) or focused (ellipsoidal reflector).

There are however applications in which the light from the lamp is not to be focused as strongly as possible but is to be concentrated onto a somewhat more extensive area. This is the case for example with regard to projector apparatuses, or if the light is to be coupled into a glass fiber. In these cases the so-called etendue (light-gathering power) is used as a parameter. The etendue is a parameter for an optical system, for example a light source, a lamp having a reflector situated around it being regarded overall as a light source in the present case. The surface onto which the reflector concentrates the light of the lamp is seen as the emitting surface of the light source. If the solid angle is also included, the etendue can be calculated. The etendue is a conserved quantity (Lagrange invariant) in all optical systems. The reflectors based on conic sections are not completely satisfactory in applications in which a certain etendue is specified.

In the technical field there has been a shift toward departing from the conic section shapes. The documents WO 2007/081812 A2, CA 2071635 C, EP 519112 A1, U.S. Pat. No. 4,355,350 A, U.S. Pat. No. 5,661,828 A and U.S. Pat. No. 6,547,416 B2 may be referenced by way of example.

SUMMARY

Various embodiments provide a reflector having a reflective surface which is better suited than previous reflectors to provide as high a light output as possible in a light source arrangement having a lamp (discharge lamp, incandescent lamp, a light emitter based on other physical effects, electrodeless lamp) such as is used for example in a projector apparatus, given a predetermined etendue of the light source arrangement and given predetermined properties of the lamp.

According to the invention, the contour of the reflective surface is traversed by a Bézier curve. In this connection, "traverse" means that a (straight) section through the reflector visibly shows a Bézier curve. In this case this should in particular be a longitudinal section, i.e. the Bézier curve should traverse the contour along the reflector. The longitudinal direction is that direction in which the light moves outward from the lamp toward the exit surface of the light source arrangement.

It has been shown that light along a Bézier curve is mapped better onto an exit surface of a light source arrangement than is the case with conic sections.

Just as rotational bodies are preferred in the case of conic sections, the contour of the reflective surface is by preference also a rotational body of a Bézier curve in the present instance.

In this case high-degree Bézier curves can in principle also be used, although by preference the Bézier curve is a rational quadratic Bézier curve (the special case of which is the quadratic Bézier curve). A quadratic Bézier curve is defined by three points which are referred to as control or Bézier points. Given a suitable choice of these points, an optimal reflector for the desired etendue and the desired arrangement can be configured as appropriate to the properties of the lamp.

Experiments have yielded the following result:

If in a discharge lamp the spacing of the two electrodes normally present in this case during operation is specified as d (with other lamp types d denotes the diameter of a sphere around the light source from which 63% of the total flux originates), and if the Bézier curve is defined as follows (according to the general definition of a rational quadratic Bézier curve) when a point on the Bézier curve has the coordinates x(t) and z(t), where t is a curve parameter between 0 and 1:

$$x(t) = \frac{(1-t)^2(1-w)x_0 + 2t(1-t)w \cdot x_1 + t^2(1-w)x_2}{(1-t)^2(1-w) + 2t(1-t)w + t^2(1-w)}$$

and $$z(t) = \frac{(1-t)^2(1-w)z_0 + 2t(1-t)w \cdot z_1 + t^2(1-w)z_2}{(1-t)^2(1-w) + 2t(1-t)w + t^2(1-w)},$$

then Bézier points $(x_i, z_i)$ where $i=0, 1, 2$ are therefore used as well as a weighting w, where the following values have in fact been revealed as preferred for these variables: w lies between 0.25 and 0.5 and preferably between 0.3 and 0.43. The variables $x_i$, $z_i$ are in the ratio of d:1 to corresponding variables $x_{10}, z_{10}$.

It holds in this case that $x_{00}$ is between 4 and 10 mm and preferably between 5.5 and 8 mm if d is specified in millimeters. Likewise it holds that $x_{10}$ is between 20 and 42 mm and preferably between 27 and 34.5 mm, and that $x_{20}$ is between 12 mm and 24 mm and preferably between 16 mm and 19.5 mm. $z_{00}$ is between −0.5 and +0.5 mm, i.e. the reflector walls begin above the space between the two electrodes. By preference they begin exactly at the level of the center point between the two electrodes, by preference therefore $z_{00}=0$ mm. $z_{20}$ lies between 30 and 112 mm and preferably between 38 and 93.5 mm. $z_{10}$ scales by a factor c, where $z_{20}$, $z_{10}=c \cdot z_{20}$, where c is between 0.22 and 0.67 and preferably between 0.30 and 0.55.

It should be noted that the above-mentioned values in particular in the case of the preferred embodiment variant expressly result in a non-monotonically increasing Bézier curve because $x_{10}$ can be greater than $x_{20}$, and also is so in the case of the preferred values. The reflector is therefore bulged to a certain extent. Just such an embodiment has proved to be advantageous, without this being dependent specifically on the values cited in the present instance. According to the definition of the factor c the bulging is in this case preferably situated behind the first third and in front of the last third of the profile of the reflector.

The light source arrangement according to the invention has a discharge lamp and the reflector according to the invention as a first reflector. It furthermore has a second reflector which (by preference) is in abutting flush contact with the first reflector. The reflectors enclose the discharge lamp. The second reflector terminates the light source arrangement on one side, namely on the side which is intended to be the non-exit side for light.

The function of the second reflector is to reflect back the light which is emitted by the discharge lamp in a direction in which it does not strike the first reflector in a per se known manner such that it does (nevertheless) reach the first reflector after being reflected. This can be achieved by means of a suitable shape and arrangement of the second reflector in respect of the discharge lamp. Shapes for the so-called back-reflector from the prior art can serve as models. For example, its shape can be part of a spherical shell, half of a spherical shell for example.

The lamp is preferably embodied in such a way that the origin of the coordinate system in which the Bézier curve is defined lies in the region of light generation, the focal point of the luminance distribution preferably lying precisely at the origin, in other words at x=0 mm and z=0 mm. This applies in particular in conjunction with the above-mentioned preferred values for the specification of the Bézier curve.

The light source arrangement can include an optical system (in other words at least one optical element) present at an end of the first reflector facing away from the second reflector, downstream of which is disposed an optical wave guide, the optical system focusing light and thus directing it into the fiber optic cable.

Alternatively, an optical integrator can be arranged at the open end of the first reflector. Such an integrator is already known per se from the prior art and is for example often used in projector apparatuses.

Thus, according to the invention, an application of the light source arrangement is also in a projector apparatus.

BRIEF DESCRIPTION OF THE DRAWINGS

The invention will be described in more detail below with the aid of several exemplary embodiments and with reference to the drawings, in which.

DETAILED DESCRIPTION

The following detailed description refers to the accompanying drawings that show, by way of illustration, specific details and embodiments in which the invention may be practiced.

Figure 1:
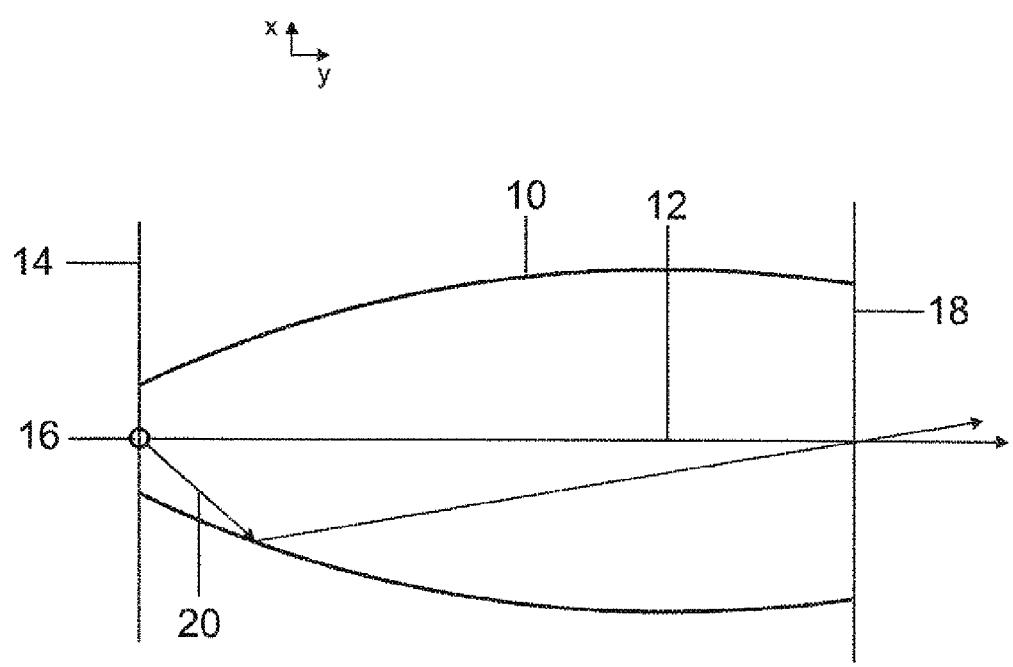
FIG. 1 shows an inventive reflector in longitudinal section.

A reflector designated as a whole by 10 is embodied as a rotational body such that it has the appearance illustrated in FIG. 1 for any given longitudinal sections which pass through an axis of rotation 12 of the rotational body. On its inner face, in other words the side facing the axis of rotation 12, the reflector has a reflective surface in a per se known manner. In the present instance the contour of the reflector 10 is not differentiated from that of the surface because the wall of the reflector 10 does not play any role for the purposes of illustration.

The axis of rotation 12 shall be defined as the z axis, while an arbitrary direction perpendicular thereto is defined as the x direction.

The function of the reflector 10 is to concentrate light of an extended light source 16, the light density focus of which is situated in a plane 14, into an exit plane 18. A light beam 20 is shown by way of example.

The contour of the reflective surface and thus the internal contour of the reflector 10 in section is precisely a rational quadratic Bézier curve, which means that the reflector 10 as a whole has the shape of a rotational body of a rational quadratic Bézier curve.

If the reflector 10 is provided for a high-pressure discharge lamp 116 having two electrodes spaced 1 mm apart (in the operating state), then the center point between the two electrodes lies precisely in the plane 14, i.e. it coincides with the light source 16. In this case the control points or Bézier points can be specified for the rational quadratic Bézier curve as $P_i=(x_i, z_i)$ where i=0, 1 or 2, wherein it holds that $x_0$ is between 5.5 and 8.0 mm and $z_0=0$ mm, that $x_2$ is between 16.0 and 19.5 mm and $z_2$ is between 38.0 and 39.5 mm, that $x_1$ is between 27.0 and 34.5 mm and $z_1=z_2 \cdot c$ where c is between 0.30 and 0.55. The weight w present in a rational quadratic Bézier curve is between 0.30 and 0.43.

If a high-pressure discharge lamp having electrode spacings different from 1 mm is provided, then in a first approximation preferred in the present instance the entire Bézier curve can be scaled correspondingly. Given an electrode spacing of $d=d_0 \cdot 1$ mm, the above values for $x_i$ and $z_i$ are therefore multiplied by $d_0$.

The above values imply that the point of greatest radius of the reflector 10 does not coincide with the plane 18. In order to produce the reflector two partial reflectors can initially be manufactured and then joined together, the junction being the point having the greatest radius. Hollow bodies having monotonically increasing radii are particularly easy to manufacture.

Figure 2:
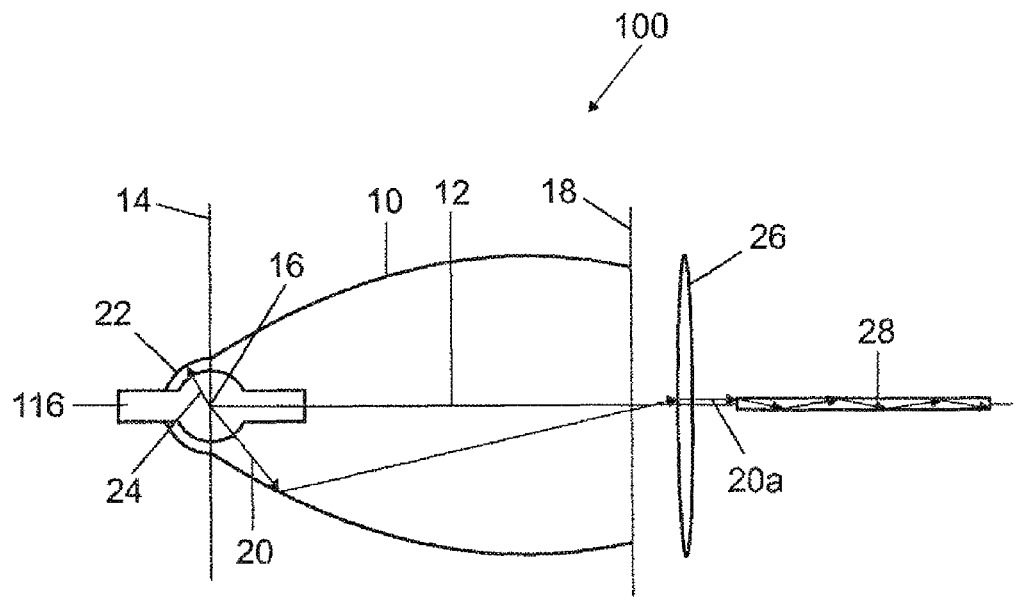
FIG. 2 shows an inventive light source arrangement in which an inventive reflector is used, according to a first embodiment variant.
Figure 3:
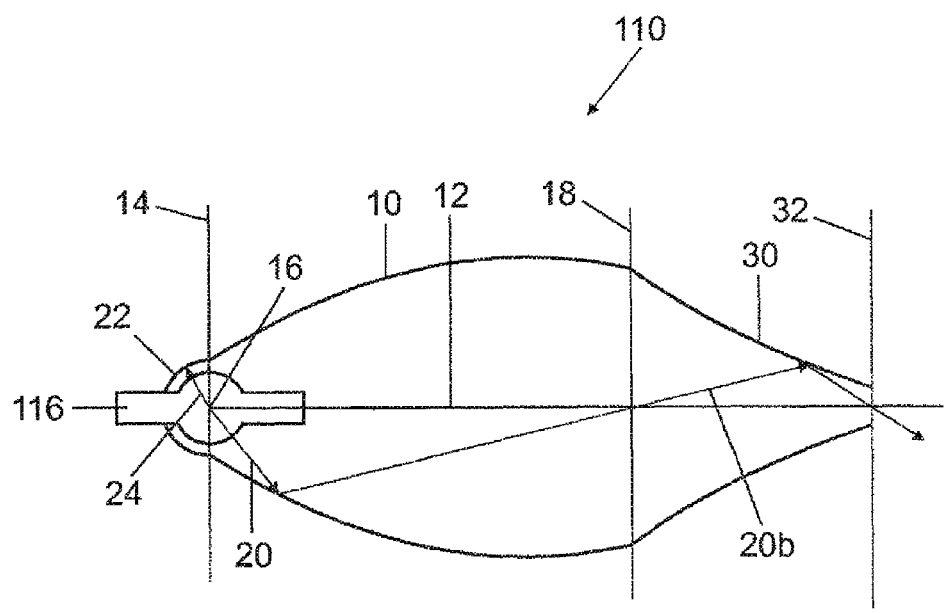
FIG. 3 shows an inventive light source arrangement in which an inventive reflector is used, according to a second embodiment variant.

In a first light source arrangement 100, which is shown in FIG. 2, and also in a second light source arrangement 110, which is shown in FIG. 3, a further reflector 22 is in abutting flush contact with the reflector 10. The second reflector 22 has the function of a back-reflector. It can have the basic shape of a hemispherical shell. It is equally possible with regard to the design of the back-reflector 22 to take into consideration the shape of the desired discharge lamp 116 used: light which is generated between the two electrodes is refracted at the transition from the space in which the electrodes are situated to the glass and again at the transition from the glass to the outside. If the shape of the glass facing inward and outward is precisely known, the back-reflector 22 can be molded into a suitable shape such that precisely light which is emitted from the one electrode tip is reflected back to the other electrode tip and vice versa. This means that the entire space between the two electrodes is mapped onto itself.

As an alternative to the illustration in FIGS. 2 and 3, it is possible simply to apply a reflective coating on the rear side of the envelope of the lamp itself. Care should then be taken in this case to ensure that the shape of the glass body onto which the reflective coating is applied is such that the light is reflected back as optimally as possible, in particular in the manner described above in relation to the back-reflector.

FIGS. 2 and 3 show by way of example a light beam 24 which is reflected back by the back-reflector.

In the light source arrangement 100, an optical system, symbolized by a lens 26, is arranged downstream of the plane 18, and an optical wave guide 28 is arranged downstream of the optical system, in other words of the lens 26. The lens 26 focuses the incident light (see light beam 20a) into the optical wave guide 28. In such arrangements the reflector 10 according to the invention proves to be particularly advantageous.

In the light source arrangement 110, the reflector 10 is immediately followed by a so-called integrator 30. This is a body in which light like the continued light beam 20b is reflected on the inner walls, and in such a way that light exits particularly homogeneously in a plane 32. In the present instance the integrator 30 is funnel-shaped; it should not be rotationally symmetrical but as a rule has a square cross-section. Other shapes of integrators 30 are conceivable. The light source arrangement 110 is preferably used in a projector apparatus.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A reflector having a reflective surface, wherein the contour of the reflective surface is traversed by a rational quadratic Bézier curve, wherein said reflector is embodied for a discharge lamp having two electrodes at a spacing d specified in millimeters, wherein it holds for a point on the Bézier curve having the coordinates x(t) and z(t), where t∈[0,1];

$$x(t) = \frac{(1-t)^2(1-w)x_0 + 2t(1-t)w \cdot x_1 + t^2(1-w)x_2}{(1-t)^2(1-w) + 2t(1-t)w + t^2(1-w)}$$

and $$z(t) = \frac{(1-t)^2(1-w)z_0 + 2t(1-t)w \cdot z_1 + t^2(1-w)z_2}{(1-t)^2(1-w) + 2t(1-t)w + t^2(1-w)}$$

wherein w is between 0.25 and 0.5 and preferably between 0.3 and 0.43, and wherein x0=d·x00, x1=d·x10, x2=d·x20, z0=d·z00, z1=d·z10, z2=d·z20, where x00 is between 4 and 10 mm, x10 is between 20 and 42, x20 is between 12 and 24 mm, z00 is between −0.5 and +0.5 mm, z20 is between 30 and 112, and z10=c·z20, where c is between 0.22 and 0.67.

2. The reflector as claimed in claim 1, wherein the contour of the reflective surface is a rotational body of a Bézier curve.

3. The reflector as claimed in claim 1, wherein x00 is between 5.5 and 8 mm.

4. The reflector as claimed in claim 1, wherein x10 is between 27 and 34.5 mm.

5. The reflector as claimed in claim 1, wherein x20 is between 16 and 19.5 mm.

6. The reflector as claimed in claim 1, wherein z00 is equal to 0.

7. The reflector as claimed in claim 1, wherein z20 is between 38 and 93.5.

8. The reflector as claimed in claim 1, wherein c is between 0.30 and 0.55.

9. A light source arrangement, comprising:
a discharge lamp,
a first reflector having a reflective surface, wherein the contour of the reflective surface is traversed by a Bézier curve, wherein said reflector is embodied for a discharge lamp having two electrodes at a spacing d specified in millimeters, wherein it holds for a point on the Bézier curve having the coordinates x(t) and z(t), where t∈[0,1];

$$x(t) = \frac{(1-t)^2(1-w)x_0 + 2t(1-t)w \cdot x_1 + t^2(1-w)x_2}{(1-t)^2(1-w) + 2t(1-t)w + t^2(1-w)}$$

and $$z(t) = \frac{(1-t)^2(1-w)z_0 + 2t(1-t)w \cdot z_1 + t^2(1-w)z_2}{(1-t)^2(1-w) + 2t(1-t)w + t^2(1-w)}$$

wherein w is between 0.25 and 0.5 and preferably between 0.3 and 0.43, and wherein x0=d·x00, x1=d·x10, x2=d·x20, z0=d·z00, z1=d·z10, z2=d·z20, where x00 is between 4 and 10 mm, x10 is between 20 and 42, x20 is between 12 and 24 mm, z00 is between −0.5 and +0.5 mm, z20 is between 30 and 112, and z10=c·z20, where c is between 0.22 and 0.67, and
a second reflector,
wherein the reflectors enclose the discharge lamp in sections and the second reflector at least partially terminates one side of the light source arrangement.

10. The light source arrangement as claimed in claim 9, wherein the second reflector is shaped in such a way and is arranged in such a way with respect to the discharge lamp that it reflects light reaching it from the discharge lamp onto the reflective surface of the first reflector.

11. The light source arrangement as claimed in claim 9, wherein an optical integrator is arranged at an end of the first reflector facing away from the second reflector.

12. The light source arrangement as claimed in claim 9, wherein at least one optical element is arranged at an end of the first reflector facing away from the second reflector and in addition there is arranged there an optical wave guide into which the at least one optical element focuses light which reaches the optical element from the first reflector.

13. A projector apparatus, comprising:
a light source arrangement, comprising:
a discharge lamp,
a first reflector having a reflective surface, wherein the contour of the reflective surface is traversed by a rational quadratic Bézier curve, wherein said reflector is embodied for a discharge lamp having two electrodes at a spacing d specified in millimeters, wherein it holds for a point on the Bézier curve having the coordinates x(t) and z(t), where t∈[0,1];

$$x(t) = \frac{(1-t)^2(1-w)x_0 + 2t(1-t)w \cdot x_1 + t^2(1-w)x_2}{(1-t)^2(1-w) + 2t(1-t)w + t^2(1-w)}$$

and $$z(t) = \frac{(1-t)^2(1-w)z_0 + 2t(1-t)w \cdot z_1 + t^2(1-w)z_2}{(1-t)^2(1-w) + 2t(1-t)w + t^2(1-w)}$$

wherein w is between 0.25 and 0.5 and preferably between 0.3 and 0.43, and wherein x0=d·x00, x1=d·x10 x2=d·x20, z0 d·z00, z1=d·z10, z2=d·z20, where x00 is between 4 and 10 mm, x10 is between 20 and 42, x20 is between 12 and 24 mm, z00 is between −0.5 and +0.5 mm, z20 is between 30 and 112, and z10=c·z20, where c is between 0.22 and 0.67, and a second reflector, wherein the reflectors enclose the discharge lamp in sections and the second reflector at least partially terminates one side of the light source arrangement.

* * * * *